United States Patent [19]

Norz

[11] 4,084,921
[45] Apr. 18, 1978

[54] WINDMILL WITH CYCLICALLY FEATHERING BLADES

[76] Inventor: Gerald R. Norz, P.O. Box 187, Fish Creek, Wis. 54212

[21] Appl. No.: 784,896

[22] Filed: Apr. 5, 1977

[51] Int. Cl.² .............................................. F03D 7/04
[52] U.S. Cl. ...................................... 416/17; 416/114
[58] Field of Search ................... 416/17, 114, DIG. 4, 416/DIG. 6, 9, 12, 13

[56] References Cited

U.S. PATENT DOCUMENTS

| | | | |
|---|---|---|---|
| 2,360,791 | 10/1944 | Putnam | 416/37 |
| 3,536,415 | 10/1970 | Kusiak | 416/114 X |
| 3,874,816 | 4/1975 | Sweeney et al. | 416/132 B |
| 3,902,072 | 8/1975 | Quinn | 416/111 |

FOREIGN PATENT DOCUMENTS

| | | | |
|---|---|---|---|
| 742,239 | 11/1943 | Germany | 416/9 |
| 830,907 | 3/1960 | United Kingdom | 416/156 |

Primary Examiner—Everette A. Powell, Jr.
Attorney, Agent, or Firm—Francis J. Bouda

[57] ABSTRACT

The invention covers a mechanism for turning a horizontal axis rotor windmill into the direction of the wind, either under the instruction of a small pilot vane, or automatically without the use of such vane. This is accomplished by cyclically controlling the pitch of the rotor blades during revolution whereby to decrease the gyro forces on the rotor when yawing, as well as to take advantage of the force of the wind on the blade to assist turning the axis into the wind. The mechanism of the present invention automatically and cyclically alters the pitch of the blades as the yaw angle of the wind changes so as to present a cyclically different angle of attack between the blades and the wind, thus utilizing the force of the wind to cause the turning of the axis of the rotor into the wind.

6 Claims, 5 Drawing Figures

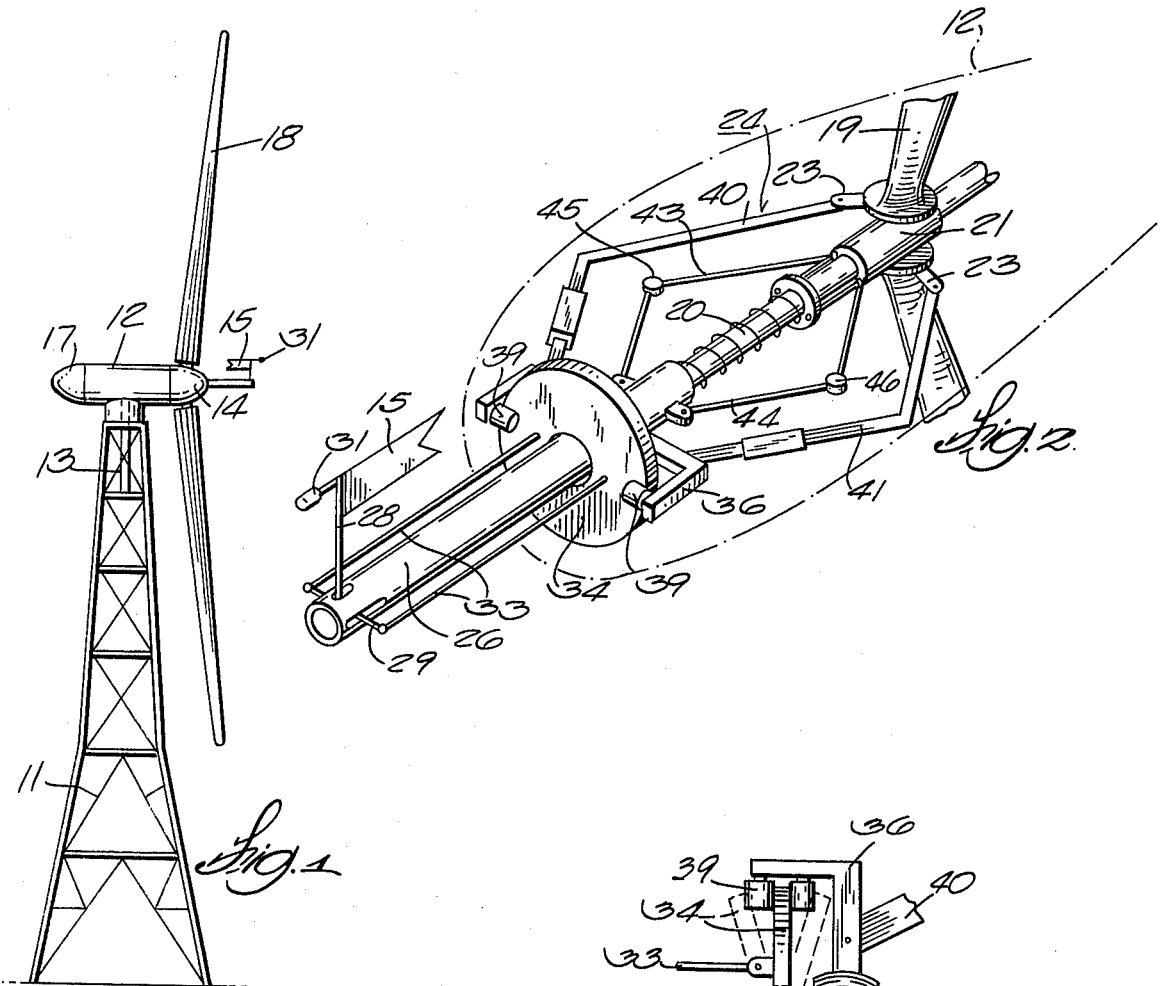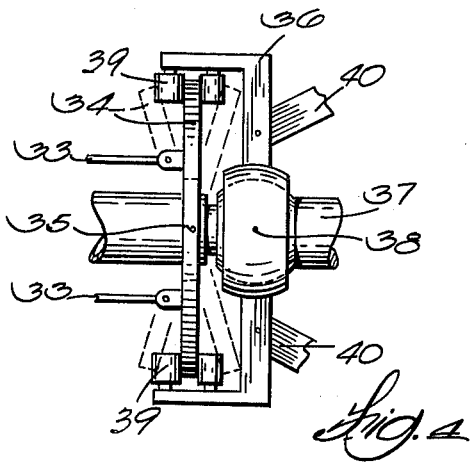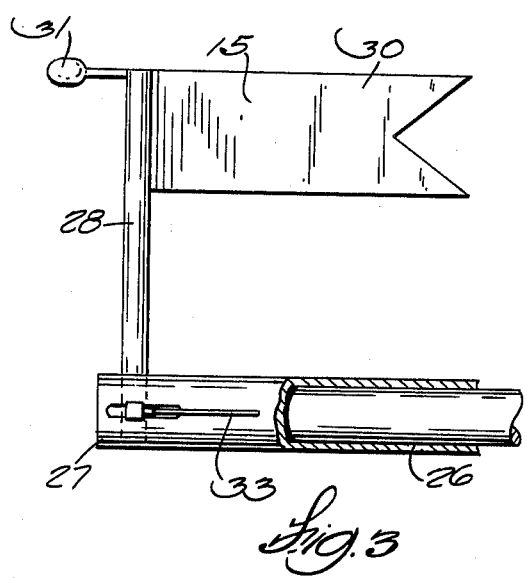

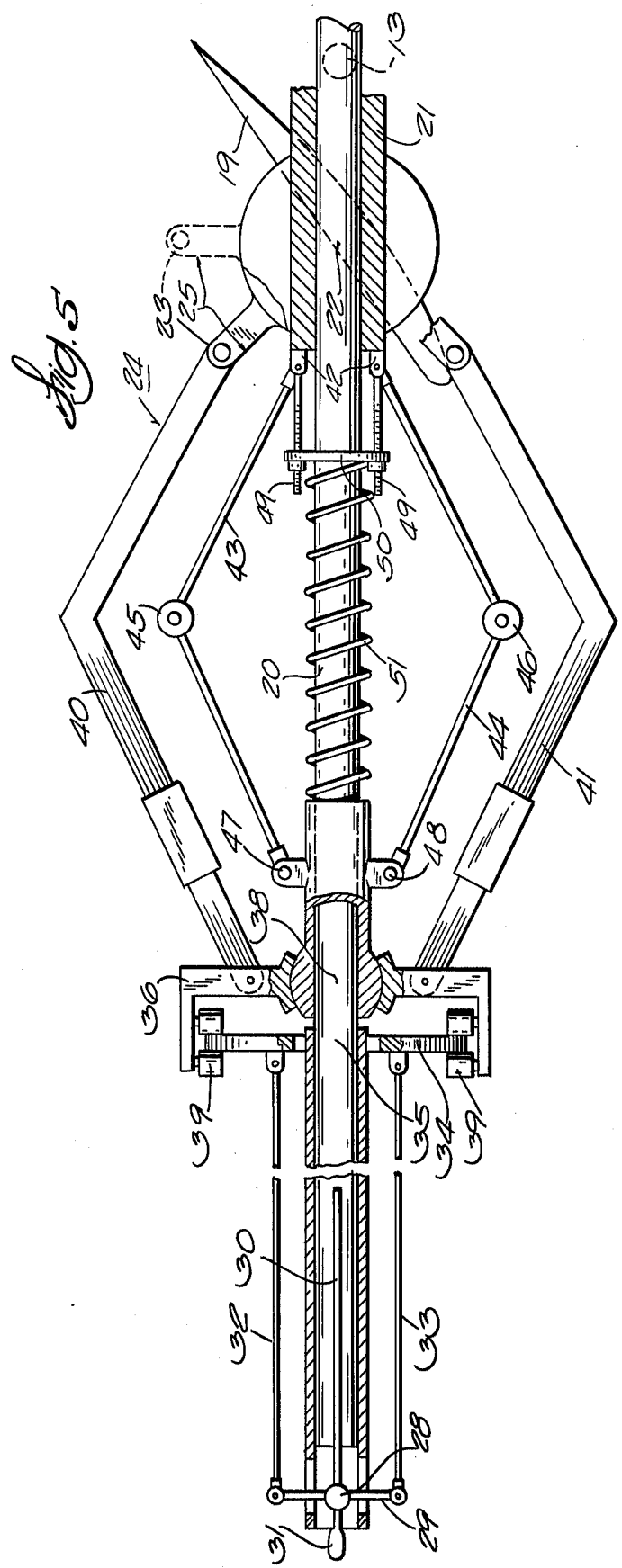

WINDMILL WITH CYCLICALLY FEATHERING BLADES

BACKGROUND OF INVENTION

Windmills of the prior art have shown that the pitch of the blades can be changed to accommodate changes in wind velocity. Thus, when the velocity of the wind increases, it is desirable to reduce the pitch of the blade so that the strong force of the wind will not blow the structure to the ground. The German Professor Ulrich Hutter, introduced a light-weight constant-speed rotor that was controlled by variable-pitch propeller blades. However, the feathering devices of the prior art did not contemplate cyclical feathering to overcome the gyro effect or to adjust for a difference in the rotor axis and the wind direction, but were designed merely to accommodate changes of velocity of the wind.

Most types of horizontal axis rotors are yaw-active and will "track" the changing direction of the wind. Small systems are usually designed to yaw using a tail-vane whereas larger systems are normally servo operated. Reference is made to U.S. Pat. Nos. 2,353,082, and 2,484,291 which show a pilot vane for rotating the entire housing into the direction of the wind. However, the devices of the prior art did not cyclically change the pitch to operate the windmill more efficiently.

Acknowledgement is also made of the devices used for cyclical change in the pitch of blades in the auto-gyro or the helicopter art, but windmills are "passive" whereas helicopters require a tail rotor to overcome the gyro forces of the "active" blade.

The need for adjusting the pitch in the windmill is becoming increasingly critical in view of the development of two-bladed windmills. The blades of such rotors have extremely great length to take advantage of continuous but fairly light winds to utilize wind energy as a means for generating power, particularly electrical power.

In order to make maximum utilization of the wind and to provide an efficient rotor, it is necessary to keep the rotor "facing" into the wind at all times and to do this it is necessary quickly to adjust to changes in wind direction and to overcome the gyroscopic effect of the rotating blades which tends to resist the easy and automatic tuning. Pilot vanes were used in the past, coupled with manual or servo means, to turn the housing which supports the rotor and to point such housing into the wind. However, such devices are ineffective in constantly changing crosswinds.

SUMMARY OF INVENTION

As the blades of windmill are spinning at a predetermined speed, they develop a gyro force which makes it difficult to turn the housing into the wind. Especially on two-bladed windmills, the smooth turning becomes very difficult, particularly when the blades approach the vertical position. Two-bladed windmills are "choppy" in their turning action. At the present time, such problems are solved by constructing multi-bladed rotors which are kept facing into the wind by the use of either a drag action (which is done by installing the blades behind the pivot point) or by a vane which controls a servo mechanism which independently drives the housing of the support into the wind. In some large installations, the movement is directed by mechanical power arrangement which creates considerable stress within the blades and thus requires extremely heavy blade construction.

In the present invention, the axis of the rotor will turn into the wind under the forces caused by the wind acting on the blades, wherein the pitch is changed cyclically when the direction of the wind is not parallel to the axis of the rotor. The wind will attack the blades on one side with a different force than the blades on the other, and this differential in force will immediately turn the rotor into the wind. Thus, the wind force operates unequally on the horizontal line of the blades, and the rotable housing will be easily and quickly turned to follow the directional movement of the vane. The structure thus includes a wind direction detecting vane which controls a swash plate connected to a set of linkage arms which can separately change the pitch on each blade throughout 360° rotation. The pitch of the blades can be modified on every blade and can be initially set for appropriate wind velocity, and as long as the pilot vane is caused by the wind to be parallel to the axis of the rotor, there will be no cyclical change in pitch. However, as the wind direction changes, the pilot vane signals the swash plate to modify the pitch of the blades, and this instantaneous modification causes the rotor to be turned so that the axis thereof faces into the wind.

The principal object of the present invention is to provide a horizontal axis rotor wind energy collector which instantaneously reacts to changes in wind direction.

Another object of the present invention is to enable two-bladed windmills to turn smoothly and easily despite gyro forces opposing such turning.

A further object of the present invention is to enable wind energy collectors automatically to be pointed into the wind instead of being dragged into position as is the present practice.

Another object of the present invention is to provide for construction of much lighter blades in large diameter wind powered machines.

With the above, and other objects in view, a more complete understanding of the present invention can be achieved by referring to the following detailed descriptions:

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangements and organizations of instrumentality as herein shall be described.

From the drawings, where, in like reference characters indicate like parts;

FIG. 1 is a side elevational view of a wind turbine of the present invention mounted on a pylon.

FIG. 2 is a perspective view of the control of one embodiment of the present invention.

FIG. 3 is a side elevational view of a pilot vane construction of the present invention.

FIG. 4 is a schematic top plan view of a swash plate control of one embodiment of the present invention.

FIG. 5 is a schematic view of one embodiment of the control mechanism of the present invention.

Referring now to FIG. 1, there is shown a pylon 11 which may be 100 to 150 ft. high, and which pylon is structurally arranged and constructed so as to support a lift-type wind powered turbine 12 at the top thereof. This windmill 12 is mounted on a vertical shaft 13 which permits the windmill 12 to be turned about the vertical axis 13 so as to bring the forward end 14 into the wind, with the pilot vane 15, mounted on the extension 16, being foremost into the wind.

Within the housing 17 of the windmill 12, a two-bladed rotor 18 is mounted. This rotor may have blades 19 which are each from 75 to 100 ft. long, providing a rotor which may be as much as 150 to 200 ft. in diameter. The housing is mounted on the pylon so that the blades 19 and the control mechanism is forward of the axis 13. This "up-wind rotor" eliminates any "shadow" effect from the pylon 11.

When such wind-operated rotor is spun about its horizontal axis by a high velocity wind, the rotor 18 is turned so rapidly as to create gyroscopic forces so great that it becomes extremely difficult to keep the horizontal axis always pointed into the wind.

In the past, the turning of the windmill into the wind has been done either manually, as in the ancient windmills in Holland, or in more recent years by power-assisted or servo-mechanism controls, either under manual instruction or by direction from a pilot vane or other detector of wind direction. However, none of these devices have successfully overcome the gyro forces of the whirling rotor. Thus the present invention is not only responsive to instantaneous changes in wind directions, but utilizes those very changes to overcome the gyro effect, and utilizes the turning forces of the rotating blades to bring the entire mechanism always into the most efficient operating position.

To that end there is provided a rotor arrangement for supporting the blades 19 of the rotor 18 as shown in FIGS. 2, 3, 4, and 5.

As stated, the rotor housing 17 is mounted on a vertical shaft 13 which is supported on the pylon. The housing 17 is an aerodynamic cocoon to contain the mechanism of the rotor, and the external surfaces thereof are cosmetically or aerodynamically chosen. The housing 17 supports a horizontal shaft 20 in such a manner that the shaft 20 can pivot in a horizontal plane about the vertical axis 13 but does not rotate about its own axis. The blades 19 of the rotor 18 are mounted on a suitable sleeve 21, so that they can rotate about the axis of the horizontal shaft 20. Each blade 19 is also supported in an inboard bearing on the sleeve 21 so that each blade can be feathered about its own axis 22. A schematic arrangement for such support is shown in FIG. 5. A crank or arm 23 is mounted on the blade 19 and connected to a control arm 24 in such a way that the crank arm 23 may be moved through an arc 25 shown in FIG. 5. This permits the blade 19 to be feathered as desired and such feathering can take place as the blade 19 turns about the horizontal shaft 20.

Thus it is seen that the blade pitch may be adjusted so that both of the blades 19 have the same pitch as desired for the appropriate existing wind conditions. That is, the blades may be feathered to a greater pitch when the wind velocity is low and be feathered to a lower pitch when the wind velocity is high so as to control the speed of rotation of the blades and the output of energy derived therefrom.

The crank 23 of each blade 19 is suitably connected so that under conditions as hereinafter described, each blade may be additionally feathered during rotation about the axis 20 so that the pitch of one blade is not the same as the pitch of the other blade. Such condition will exist, as hereinafter described, when the shaft 20 is not pointing directly into the wind, and the angular difference between wind direction and the direction of the shaft 20 will cause the blades to differentially feather and to turn the entire windmill into the wind.

To accomplish this end, there is provided the following structure. The shaft 20, which is disposed horizontally and at right angles to the vertical shaft 13, is fastened to the shaft 13 so that it can pivot in a horizontal plane around the axis of the shaft 13 but cannot rotate about its own axis.

At the forward end of the shaft 20 a sleeve 26 is free to slide axially along the shaft 20 but is not free to rotate. The forward end of the sleeve 26 extends beyond the forward end 27 of the shaft 20 and has mounted thereon for vertical rotation in an appropriate support a vertical shaft 28 having a cross bar 29 attached thereto, and having a wind vane 30 affixed to the upper end of the shaft 28 with a counterbalancing weight 31 extending forwardly.

The wind vane 30 and the shaft 28 are free to pivot about the axis 18 and will be actuated by even slight changes in wind direction because of the counterweight 31. Thus the crossbar 29 can swing right and left as the wind vane is actuated by changes in the wind direction, and the control cables 32 and 33 can be pulled in or out as the crossbar 29 is moved.

The control cables 32 and 33 are connected at their rearward ends to a swash plate 34 which is mounted on a pivot 35 on the sleeve 26 so that the swash plate may rotate about the vertical axis 35 when actuated by the control cables 32 and 33. Thus the swash plate can swing to and fro as shown in an exaggerated illustration in FIG. 4.

In operative connection with the swash plate 34 is the follower 36 which is mounted on a sleeve 37 so that it can pivot about the ball joint 38 when directed to do so by the swash plate 24. The outer end of the follower 36 is in operative connection with the swash plate 34 by means of rollers 39 which are pivotally mounted in the follower 36 so that they are in contact with the edge of the swash plate 34 and cause the follower to swing about the ball joint 38 when the swash plate is moved as shown in FIG. 4. This movement of the follower 36 is communicated to the crank 23 of the blade housing by the links or arms 40 and 41; one of the cranks 23 being connected to one of the blades 19 and the other crank being connected to the second blade 19.

Thus it can be seen that the tilting of the swash plate 34 under the instructions of the vane 30 causes the actuation of the arms 40 and 41, and the blades 19 will be cyclically feathered as the rotor turns through 360° around the axis 20.

As long as the vane 30 is in alignment with the axis of the shaft 20, there is no differential feathering of the blades as the rotor turns through 360°. However, as soon as the vane is moved out of alignment with the shaft 20 by a change of wind direction, the movement is transmitted immediately to the swash plate 34 and through the links 40 and 41 to the blades 19 during rotation. This differential pitch of the blades will cause the entire rotor housing to pivot about the vertical axis 13 and bring the axis of the shaft 20 again into alignment with the wind direction.

Because the swash plate pivots only about the vertical axis 35 there is no differential feathering of the blades when in the vertical position and hence the control is operative only in yaw and not in pitch.

Furthermore, because the pitch control is cyclical and varies sinusoidally from vertical through horizontal to opposite vertical, the gyro forces are balanced throughout the entire 360° turn of the rotor, and the resisting forces to bring the rotor into alignment with the wind are overcome.

Although I have suggested that the swash plate responds only to yaw changes of the wind, in those areas where wind shear over the ground is substantial and the blades are far above the ground at top of rotation, a second horizontal pilot vane can be installed to detect vertical differences in wind pressure so as to control the feathering differentially about a horizontal plane as well as a vertical plane.

Additionally I provide a control mechanism so that both blades may be feathered simultaneously and automatically to compensate for gusting wind or changes in wind speed. Thus the rotor sleeve 21 has a pair of supports 42 to which link arms 43 and 44 can be mounted, with fly weights 45 and 46 mounted thereon, and also connected through the supports 47 and 48 to the sleeve 37. A pair of adjusting screws 49 are connected to the sleeve 21 with a plate 50 mounted thereon and with a spring 51 interposed between the plate 50 and the sleeve 37. When the rotor turns, the fly weights 45 and 46 are forced outwardly against the action of the spring 51 and can position the sleeve 37 axially along the shaft in respect to the position of the sleeve 21. Any movement of the fly weights 45 and 46 outwardly as the rotor turns will cause a decrease in the feathering of the blades and the force of the wind will have less effect thereupon. As the wind velocity increases and the fly weights turn faster, the pitch of both blades is simultaneously and equally reduced. The plate 50 can be adjusted to increase or decrease the compression force of the spring 51 and thus compensate, as desired, for changing wind velocities in various geographic locations.

An additional embodiment of the invention, not shown or illustrated, eliminates the external pilot vane. In this case, pressure sensitive pads are installed in the blades underneath the air foil surface, and when the wind strikes the blades at an angle to the axis of the rotor, the pressure pads under the surface of the blade face will be activated more strongly when the blade is swinging angularly into the wind than when the blade is falling away from the wind. This differential pressure is detected, transmitted, amplified and utilized to actuate a swash plate or other control so as to adjust the pitch of the blade and, therefore, swing the rotor axis into alignment with the wind direction.

It is to be understood that the present invention may be embodied in other specific forms which depart from the spirit or special attributes hereof, and it is, therefore, desired that the present embodiment be considered in all respects as illustrative and, therefore, not restrictive, reference being made to appended claims rather than to the foregoing description to indicate the scope of the invention.

Having thus described my invention, what I claim as new and desire to protect by letters patent are the following:

1. A wind energy collector having a rotor turning on a horizontal axis, said rotor having at least one blade pivotly mounted thereon and being adjustable in pitch throughout 360° rotation of said rotor, detector means to sense a deviation between the wind direction and the axis of rotation of said rotor, control means to translate the amount of deviation to the blade and cyclically and differentially to vary the pitch of the blade so that the blade has a flatter pitch when the angle between blade and wind direction is acute and a greater pitch when the angle between blade and wind direction is obtuse, whereby to cause the axis of the rotor to turn into alignment with the wind direction, the differential pitch being zero when the axis of the rotor is in alignment with the wind direction.

2. The wind energy collector of claim 1 wherein the rotor has at least two blades.

3. The wind energy collector of claim 1 wherein the detector is a pilot vane and the control means includes a swash plate and connecting arm, said pilot vane being operatively connected to the swash plate, whereby cyclically to vary the pitch of the blade by means of the connecting arm, throughout 360° rotation of the rotor.

4. The wind energy collector of claim 1 wherein the detector has at least one pressure pad mounted in the blade whereby to detect changes in the wind pressure against the surface of the blade, and the control means is a pressure translating mechanism whereby to detect differential pressure during rotation of the blade and to act upon the rotor and to cause the axis of the rotor to move into alignment with the wind direction.

5. A wind energy collector including a support, a housing mounted on said support by a vertical axis whereby said housing may rotate through a horizontal plane, a horizontal shaft in said housing, at least one blade pivotally mounted on a sleeve which rotates on said shaft, said blade having a crank arm connected thereto, an axially movable sleeve mounted on said shaft and extending there beyond, a pilot vane mounted on a shaft extending at right angles from and pivotally connected to the outer end of said last-named sleeve, a crank arm connected to said shaft of the wind vane, a swash plate pivotally mounted on said last named sleeve, at least one control rod connecting said crossbar on said wind vane and said swash plate whereby to tilt the swash plate when said wind vane is not in alignment with said shaft, a follower plate rotatably mounted about and in operative connection with the outer edges of said swash plate, at least one connector arm operatively inter-connecting said swash plate and the crank on said blade, whereby to adjust the pitch of said blade, when said swash plate and follower are operatively moved by the control rod as the wind vane pivots about its axis.

6. The wind energy collector of claim 5 having at least two blades mounted on said sleeve and separately pivotal, a plurality of control rods, linking the cranks on the blades and the follower of said swash plate so as differentially and cyclically to adjust to the pitch of said blades when the wind direction is not in alignment in the shaft and the wind vane is at an angle to the axis of the shaft.

* * * * *